US009446736B2

(12) United States Patent
Ando (10) Patent No.: US 9,446,736 B2
(45) Date of Patent: Sep. 20, 2016

(54) PILLAR GARNISH

(71) Applicant: TOYOTA BOSHOKU KABUSHIKI KAISHA, Aichi-ken (JP)

(72) Inventor: Hiroshi Ando, Nagoya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/751,674

(22) Filed: Jun. 26, 2015

(65) Prior Publication Data

US 2016/0001737 A1   Jan. 7, 2016

(30) Foreign Application Priority Data

Jul. 3, 2014   (JP) .................................. 2014-137634

(51) Int. Cl.
*B60R 13/02* (2006.01)
*B60R 22/20* (2006.01)

(52) U.S. Cl.
CPC ........... *B60R 22/201* (2013.01); *B60R 13/025* (2013.01)

(58) Field of Classification Search
CPC .... B60R 22/201; B60R 13/025; B62D 25/04
USPC ............... 296/193.06, 39.1, 1.08; 289/730.2, 289/801.2
See application file for complete search history.

(56) References Cited

U.S. PATENT DOCUMENTS 6,454,305 B1 * 9/2002 Prottengeier ........... B60R 21/04
280/751
2013/0313848 A1 * 11/2013 Gemma ................ B60R 13/025
296/1.08

FOREIGN PATENT DOCUMENTS

GB       2338456       * 12/1999
JP     2005-324683       11/2005

* cited by examiner

*Primary Examiner* — Dennis H Pedder
(74) *Attorney, Agent, or Firm* — Greenblum & Bernstein, P.L.C.

(57) ABSTRACT

A pillar garnish includes a body, a sliding plate, a mounting base, and a bridging portion. The body includes a decorative surface facing an inner side of a compartment of a vehicle and a back surface opposite from the decorative surface. The body extends in an extending direction of a pillar of the vehicle and mounted to the pillar with space between the back surface thereof and the pillar. The sliding plate is slidable along the back surface. The mounting base on the back surface is for mounting the body to the pillar. The bridging portion on the body is for retaining space in which the sliding plate is inserted between the back surface and the mounting base and for holding the mounting base.

17 Claims, 10 Drawing Sheets

PILLAR GARNISH

CROSS REFERENCE TO RELATED APPLICATION

This application claims priority from Japanese Patent Application No. 2014-137634 filed on Jul. 3, 2014. The entire contents of the priority application are incorporated herein by reference.

TECHNICAL FIELD

The present disclosure relates to a pillar garnish.

BACKGROUND

A pillar garnish including a sliding plate for adjusting a height of a seatbelt has been known. The sliding plate included in such a pillar garnish is disposed on a back surface of the pillar garnish. The sliding plate is slidable in the vertical direction. Such a pillar garnish may be mounted to a vehicle pillar beside a vehicle seat (e.g., a center pillar).

The sliding plate may include a knob for adjustment of the height of the seatbelt. The knob may be moved by an occupant of a vehicle in the vertical direction to slide the sliding plate in the vertical direction. By moving the knob in the vertical direction, that is, sliding the sliding plate in the vertical direction, the occupant can adjust the height of the seatbelt.

The pillar garnish includes a clip mount for mounting the pillar garnish to the pillar of the vehicle. The clip mount is for holding a mounting clip. The clip mount projects from the rear surface of the pillar garnish toward the pillar. The clip mount needs to be arranged so that obstruction does not occur between the clip mount and the sliding plate.

The clip mount may include an undercut at a base thereof to avoid the obstruction. The undercut extends along a sliding direction in which the sliding plate slides. An edge of the sliding plate passes through the undercut when the sliding plate slides.

If only a small portion of a mounting base of the clip mount overlaps the sliding plate, the configuration including the undercut may be able to reduce the obstruction between the mounting base and the sliding plate. However, if a large portion of the mounting base of the clip mount overlaps the sliding plate (e.g., the mounting base is disposed in front of the sliding plate with respect to the sliding direction of the sliding plate), the undercut may not be formed in the mounting base or may be too large to maintain the mounting base in a stable condition. Conventional technologies cannot properly reduce the obstruction between the sliding plate and the mounting base.

An object is to provide a pillar garnish that is less likely to create obstruction between a sliding plate and a mounting base of a clip mount that are arranged so as to overlap each other.

SUMMARY

A pillar garnish includes a body, a sliding plate, a mounting base, and a bridging portion. The body includes a decorative surface facing an inner side of a compartment of a vehicle and a back surface opposite from the decorative surface. The body extends in an extending direction of a pillar of the vehicle and mounted to the pillar with space between the back surface thereof and the pillar. The sliding plate is slidable along the back surface. The mounting base on a back surface side is for mounting the body to the pillar. The bridging portion on the body is for retaining space in which the sliding plate is inserted between the back surface and the mounting base and for holding the mounting base.

DETAILED DESCRIPTION

Embodiment

An embodiment will be described with reference to FIGS. 1 to 8. A pillar garnish 1 arranged on one of sides of a compartment 2 of a right-hand drive vehicle according to this embodiment will be described.

Figure 1:
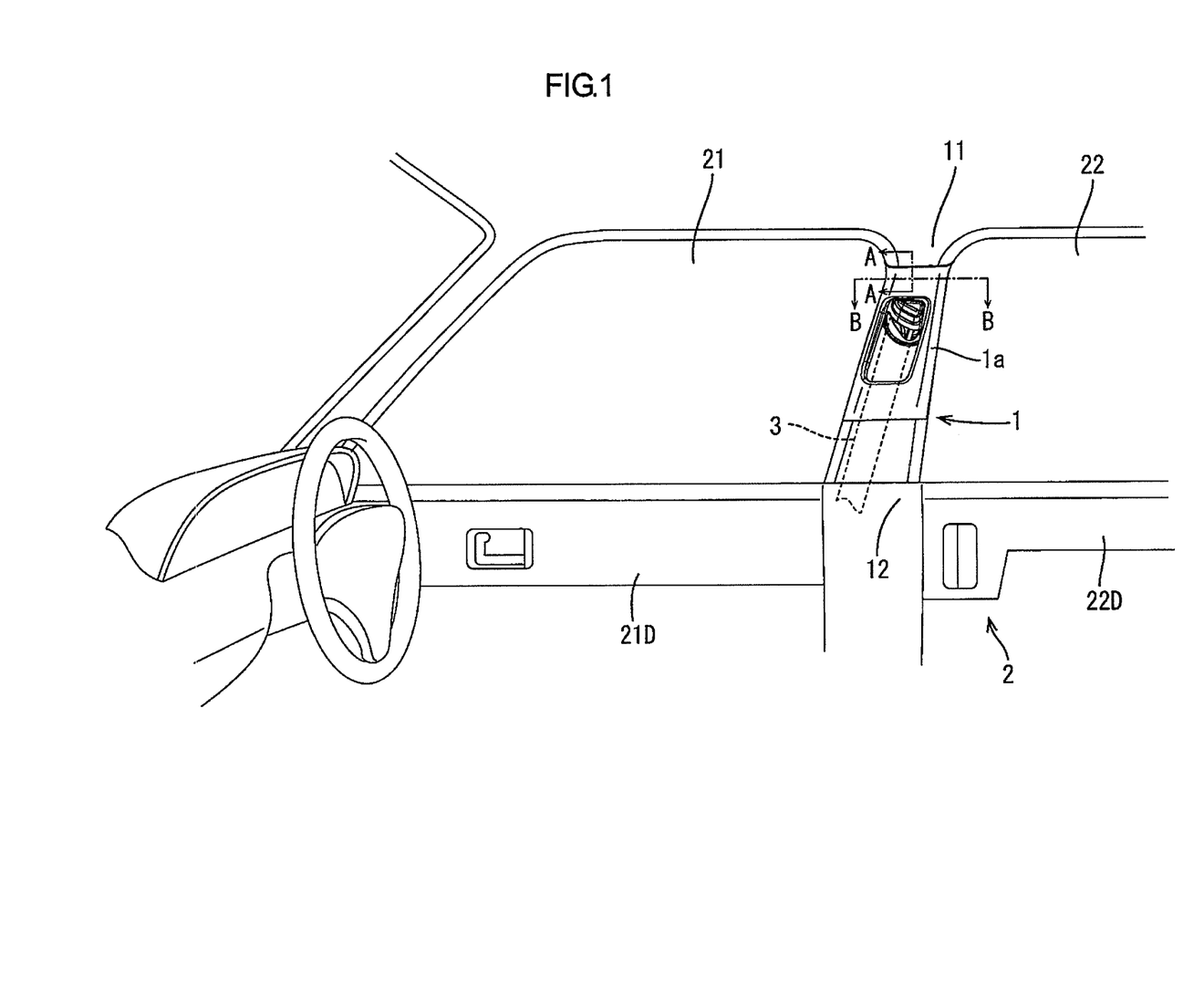
FIG. 1 is a view of an interior of a vehicle including a pillar garnish according to an embodiment.

As illustrated in FIG. 1, the pillar garnish 1 is mounted to an interior surface of a pillar P of a right wall of the compartment 2 (so-called a B pillar or a center pillar). The pillar garnish 1 is arranged closer to the right side of the vehicle than a driver's seat (not illustrated). A seatbelt 3 for the driver's seat is pulled out of the pillar garnish 1 toward the inner side of the compartment 2.

As illustrated in FIG. 1, a ceiling component 11 for a ceiling of the compartment 2 is arranged above the pillar garnish 1 and a right wall component 12 that forms a portion of the right wall of the compartment 2 is arranged below the pillar garnish 1. The pillar garnish 1 is connected between the ceiling component 11 and the right wall component 12.

A surface of the pillar garnish 1 facing the inner side of the compartment 2 is a decorative surface 1a and the other surface of the pillar garnish 1 facing the pillar P is a back-side surface 1b.

The pillar garnish 1 includes a body 4, a sliding plate 5, a mounting base 6, and a bridging portion 7.

The body 4 has a shape that extends along the pillar P that extends in the top-bottom direction of the vehicle. The body 4 is made of synthetic resin such as polypropylene and formed using a designed die. The body 4 has proper strength and elasticity for maintaining its shape. The surface of the body 4 facing the inner side of the compartment 2 is referred to as a decorative surface 4a. The decorative surface 4a of the body 4 forms a large portion of the decorative surface 1a of the pillar garnish 1a. The back surface of the body 4 facing the outer side of the compartment 2 is referred to a back surface 4b. A covering member may be attached to a surface of the body 4.

The body 4 is mounted to the pillar P so as to cover the pillar P with space between the back surface 4b and the pillar P. A portion of the seatbelt 3 is retracted by a seatbelt retractor (not illustrated) and held in the space between the body 4 and the pillar P.

Figure 3:
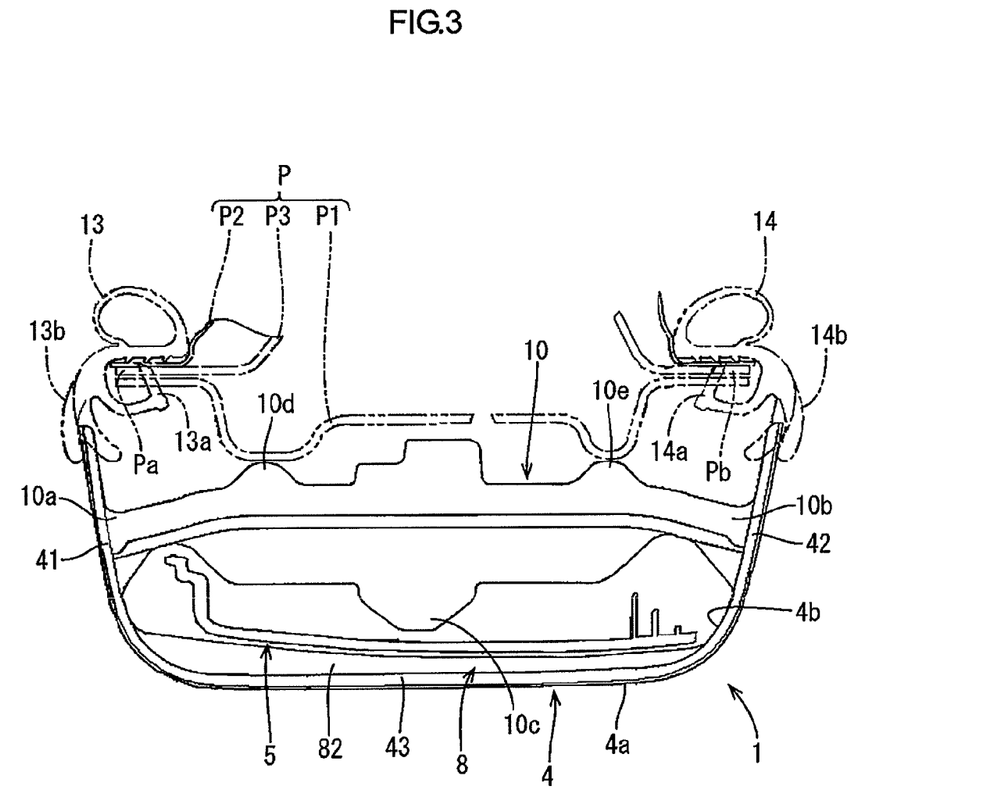
FIG. 3 is a cross-sectional view of FIG. 1 along line B-B.

As illustrated in FIG. 3, the body 4 has a shape that curves and bulges from the outer side of the compartment 2 (the pillar P side) toward the inner side of the compartment 2. The body 4 includes a front sidewall portion (a first sidewall portion) 41, a rear sidewall portion (a second sidewall portion) 42, and a middle wall portion 43. The front sidewall portion 41 and the rear sidewall portion 42 extend along the extending direction of the pillar P. The front sidewall portion 41 and the rear sidewall portion 42 are separated from each other in the front-rear direction of the vehicle. The middle wall portion 43 is between the front sidewall portions 41 and the rear sidewall portion 42. The front sidewall portion 41, the rear sidewall portion 42, the middle wall portion 43, and a surface of the pillar P define the space between the back surface 4b and the pillar P.

The pillar P is a metal panel component arranged between a front door 21D and a rear door 22D so as to separate the front door 21D and the rear door 22D from each other (see FIG. 1). As illustrated in FIG. 3, the pillar P includes an inner panel P1, an outer panel P2, and a reinforcement panel P3. The inner panel P1 is arranged on the inner side of the vehicle. The outer panel P2 is arranged on the outer side of the vehicle. The reinforcement panel P3 is arranged between the inner panel P1 and the outer panel P2. Side portions of the inner panel P1, the reinforcement panel P3, and the outer panel P2 closer to the front side of the vehicle are bound together. Side portions of the inner panel P1, the reinforcement panel P3, and the outer panel P2 closer to and the rear side of the vehicle are bound together. A portion of the inner panel P1 between the side portions bulges toward the inner side of the vehicle and a portion of the outer panel P2 between the side portions bulges toward the outer side of the vehicle. Therefore, an overall shape of the pillar P has a tubular shape.

The pillar P includes a side edge Pa closer to the front side of the vehicle. A first weather strip 13 is attached to the side edge Pa. The first weather strip 13 is made of elastic material such as rubber and formed in a shape that extends along the side edge Pa of the pillar P closer to the front side of the vehicle. The first weather strip 13 is for filling a gap between a front windshield 21 and the pillar P. The first weather strip 13 includes a holding portion 13a and a lip portion 13b. The holding portion 13a holds the side edge Pa of the pillar P and a hook 44 at an end of the body 4 closer to the front side of the vehicle (an end of the front sidewall portion 41). The lip portion 13b fills the gap between the end of the body 4 closer to the front side of the vehicle (the end of the front sidewall portion 41) and the side edge Pa.

A second weather strip 14 is attached to the edge Pb of the pillar P closer to the rear side of the vehicle. Similar to the first weather strip 13, the second weather strip 14 is made of elastic material such as rubber and formed in a shape that extends along the side edge Pb of the pillar P closer to the rear side of the vehicle. The second weather strip 14 is for filling a gap between a rear windshield 22 and the pillar P. The second weather strip 14 includes a holding portion 14a and a lip portion 14b. The holding portion 14a holds the side edge Pb of the pillar P and a hook 45 at an end of the body 4 closer to the rear side of the vehicle (an end of the rear sidewall portion 42). The lip portion 14b fills the gap between the end of the body 4 closer to the rear side of the vehicle (the end of the rear sidewall portion 42) and the side edge Pb.

Figure 4:
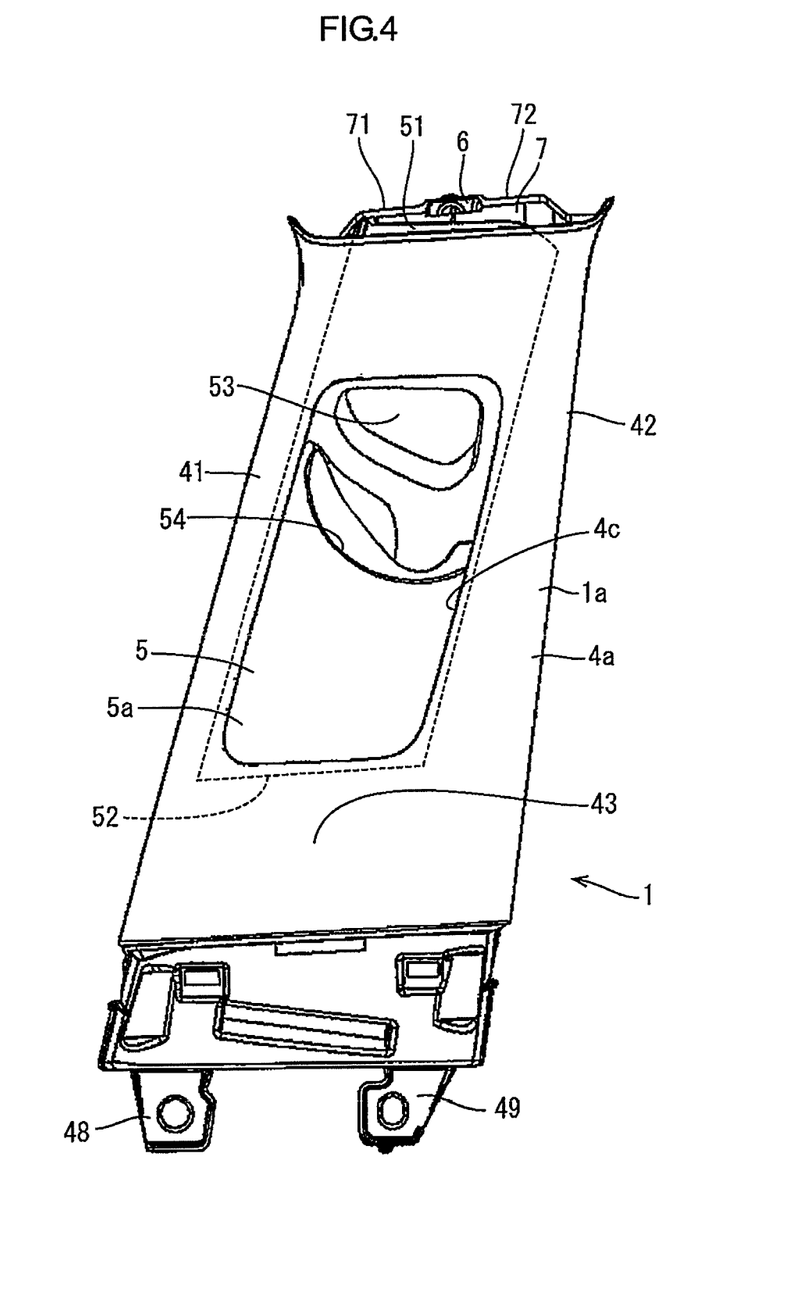
FIG. 4 is a front-side view of the pillar garnish.

As illustrated in FIG. 4, the middle wall portion 43 of the body 4 includes a hole 4c through which a portion of the sliding plate 5 is viewed from the inner side of the compartment 2. The hole 4c is a through hole that runs through in the thickness direction of the middle wall portion 43 (the right-left direction of the vehicle). The hole 4c has a long dimension in the longitudinal direction of the body 4c.

Figure 5:
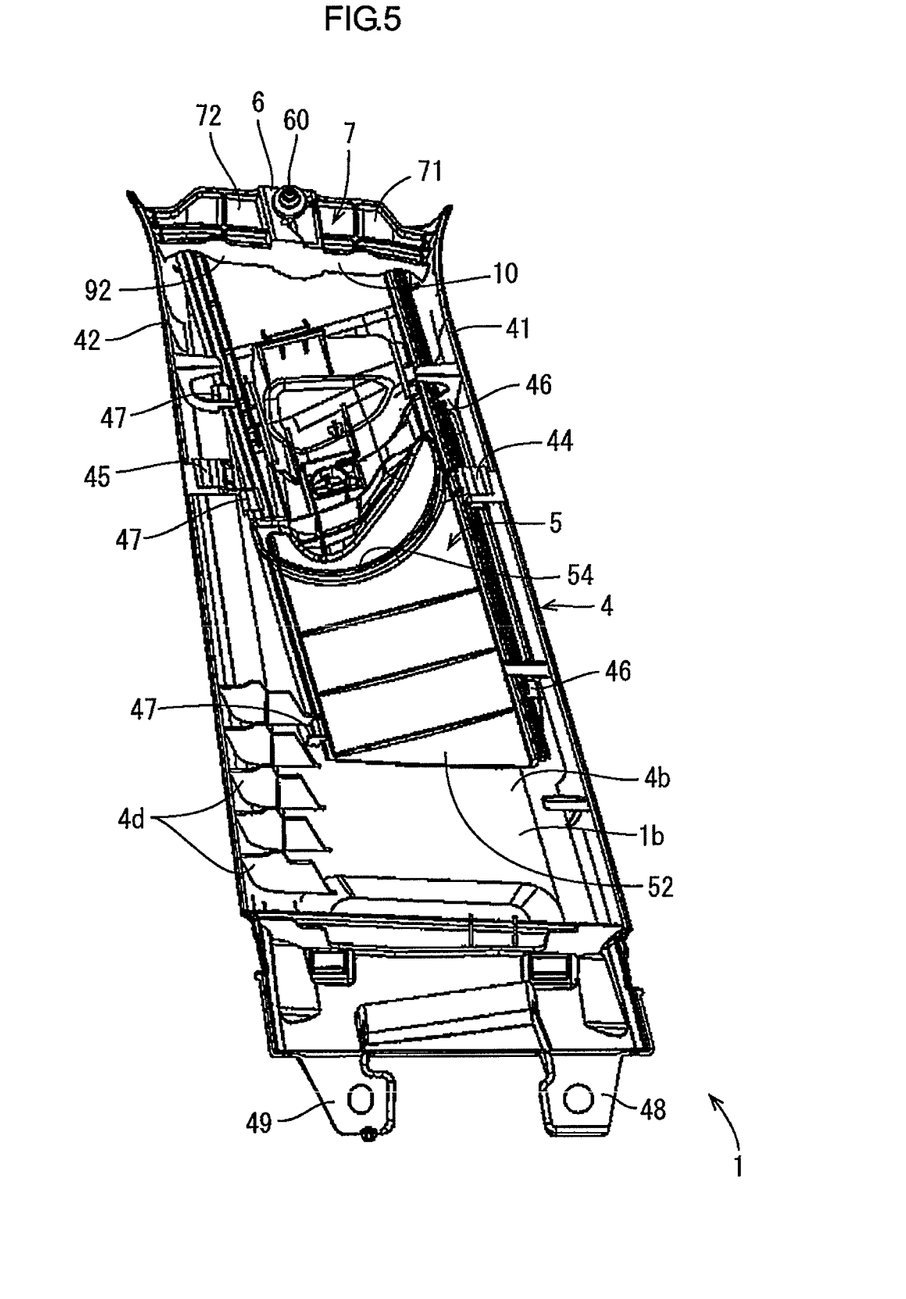
FIG. 5 is a back-side view of the pillar garnish.
Figure 6:
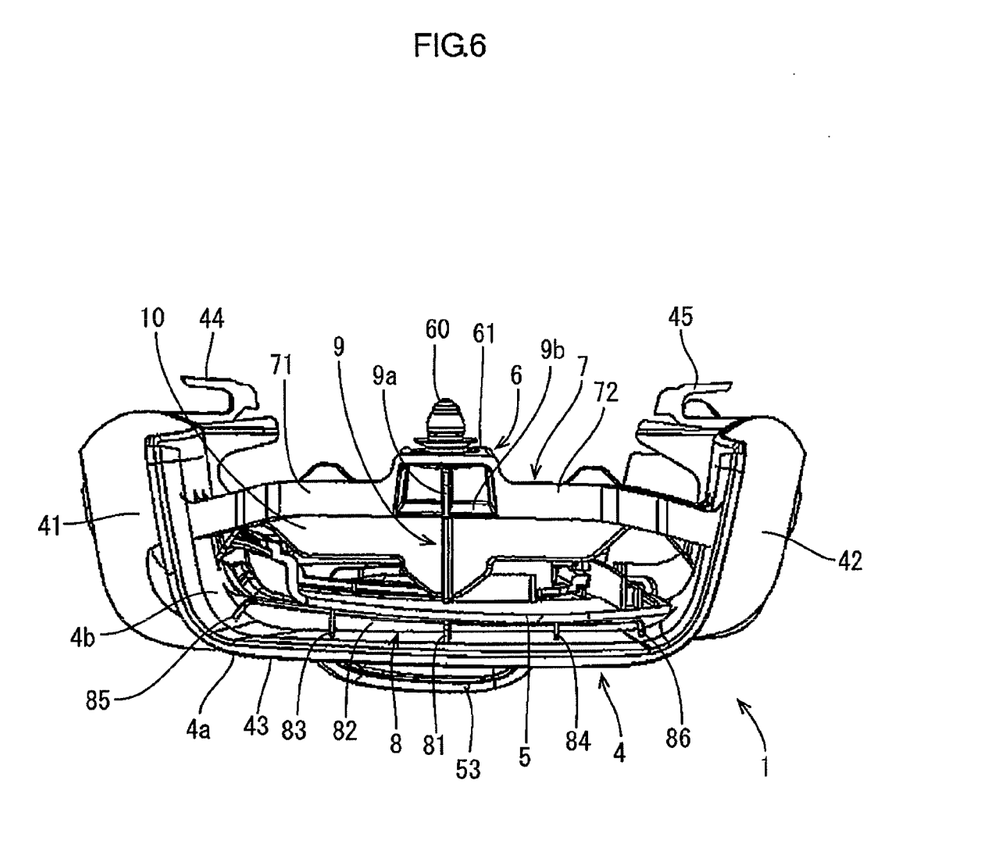
FIG. 6 is a top view of the pillar garnish.
Figure 7:
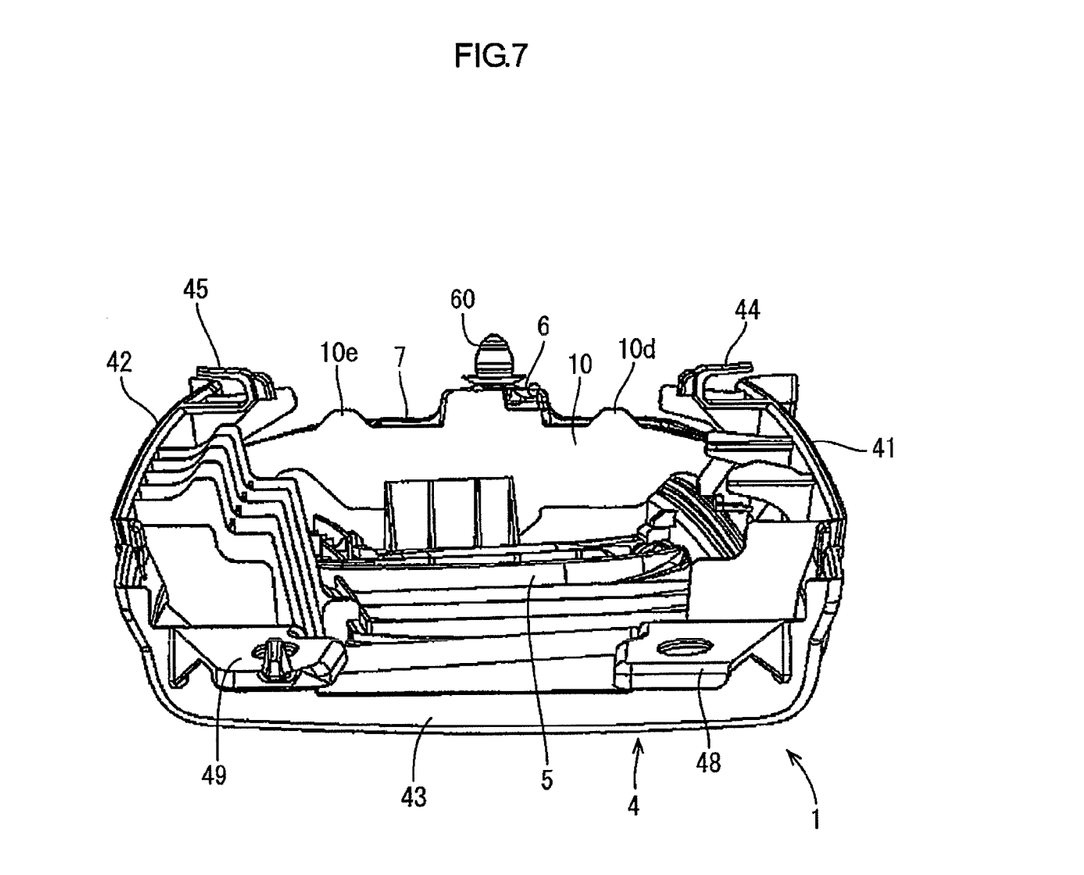
FIG. 7 is a bottom view of the pillar garnish.

As illustrated in FIG. 5, the pillar garnish 1 includes first guides 46 and second guides 47 that hold the sliding plate 5 from the front side and the rear side of the vehicle. The sliding plate 5 is held so as to be slidable in the longitudinal direction of the body 4 (i.e., the vertical direction) along the back surface 4b on the back surface 4b side of the body 4. Each first guide 46 has a shape that extends from the front sidewall portion 41 along the back surface 4b of the middle wall portion 43 toward the rear side of the vehicle. The first guides 46 hold the sliding plate 5 from the outer side of the vehicle. Each second guide 47 has a shape that extends from the rear sidewall portion 42 along the back surface 4b of the middle wall portion 43 toward the front side of the vehicle side of the vehicle. The second guides 47 hold the sliding plate 5 from the outer side of the vehicle.

The body 4 is held with the first guides 46 and the second guides 47 such that the sliding plate 5 is sliceable on the back surface 4b in the vertical direction. The first guides 46 are in contact with one of long edges of the sliding plate 5 and the second guides 47 are in contact with the other one of the long edges of the sliding plate 5 while the sliding plate 5 is sliding in the vertical direction.

The body 4 includes plate-like mounting portions 48, 49 at a lower edge thereof. The mounting portions 48, 49 are used for mounting the pillar garnish 1 to the pillar P. The body 4 includes plate-like reinforcement ribs 4d that project from the back surface 4b in a lower area thereof from the middle wall portion 43 to the rear sidewall portion 42. The reinforcement ribs 4d are arranged such that obstruction does not occur between the reinforcement ribs 4d and the sliding plate 5.

The sliding plate 5 is a component that is slidable along the back surface 4b of the body 4. The seatbelt 3 is hooked to the sliding plate 5 such that the height of the seatbelt 3 is adjustable according to a physical size of an occupant. The sliding plate 5 has a rectangular overall shape that extends in the longitudinal direction of the body 4. An end of the sliding plate 5 in the sliding direction thereof is located on the upper side of the compartment 2 and referred to as an upper end 51. The other end of the sliding plate 5 in the sliding direction thereof is located on the lower side of the compartment 2 and referred to as a lower end 52.

The sliding plate 5 includes a knob 53 at about the middle thereof in the sliding direction (the longitudinal direction). A user (or an occupant) can move the sliding plate 5 in the vertical direction by holding the knob 53. The knob 53 has a shape that protrudes from a flat portion of the sliding plate 5 toward the inner side of the compartment 2. The knob 53 project toward the inner side of the compartment 2 over the hole 4c of the body 4. This configuration allows the user to easily move the knob 53 while holding the knob 53.

The sliding plate 5 is slidable up to a position at which the knob 53 hits an upper edge of the hole 4c. In FIGS. 4 and 5, the knob 53 is in contact with the upper edge of the hole 4c and the sliding plate 5 is at the uppermost position that is an upper limit of the sliding plate 5 to move. The lowermost position of the sliding plate 5, that is, a lower limit of the sliding plate 5 to move is at a position where a specific portion of the sliding plate 5 hits a specific portion of the body 4.

The sliding plate 5 includes an insertion hole 54 through which the seatbelt 3 is passed. The insertion hole 54 is located below the knob 53. The seatbelt 3 is hooked to a lower edge of the insertion hole 54. The sliding plate 5 is prepared by molding synthetic resin such as polypropylene with a designed die.

The mounting base 6 is for mounting the pillar garnish 1 to the inner panel P1. The mounting base 6 is arranged close to an upper end portion of the back surface 4b of the body 4. The mounting base 6 is held by the bridging portion 7 on the back surface 4b side of the body 4, which will be described later. As illustrated in FIG. 4, the mounting base 6 is arranged at a position that overlaps an upper end 51 of the sliding plate 5. The mounting base 6 in this embodiment is a clip mounting base for holding a clip 60 that is an elastically deformable protrusion made of synthetic resin.

The mounting base 6 includes a seating surface 61 at a top facing the outer side of the vehicle. The clip 60 is held by the seating surface 61 with a base portion thereof fitted in a holding hole 62. The inner panel P1 of the pillar P includes a clip hole P11 that is a through hole for fitting the clip 60 therein. During insertion of the clip 60 held by the mounting base 6 into the clip hole P11, the clip 60 elastically deforms and then enters the clip hole P11 in the inner panel P1. The clip 60 is fitted in the clip hole P11 and the pillar garnish 1 is fixed to the pillar P.

The bridging portion 7 is connected between the front sidewall portion 41 and the rear sidewall portion 42 of the body 4. Space is provided between the back surface 4b of the body 4 and the mounting base 6 for passing the sliding plate 5. The bridging portion 7 holds the mounting base 6. The bridging portion 7 includes a front bridging portion (a first bridging portion) 71 and a rear bridging portion (a second bridging portion) 72. The front bridging portion 71 continues from a front end (a first end) of the mounting base 6 closer to the front sidewall portion 41 to the back surface 4b of the body 4. The front bridging portion 71 connects the mounting base 6 to the front sidewall portion 41. The rear bridging portion 72 continues from a rear end (a second end) of the mounting base 6 closer to the rear sidewall portion 42 to the back surface 4b of the body 4. The rear bridging portion 72 connects the mounting base 6 to the rear sidewall portion 42. The front bridging portion 71 and the rear bridging portion 72 have elongated shapes that extend in the front-rear direction of the vehicle. The mounting base 6 is arranged at about the middle of the body 4 in the front-rear direction of the vehicle between the front bridging portion 71 and the rear bridging portion 72. The bridging portion 7 is integrally formed with the body 4 and made of the same material as that of the body 4. The front sidewall portion 41, the rear sidewall portion 42, the middle wall portion 43, the front bridging portion 71, the rear bridging portion 72, and the mounting base 6 define space through which the sliding plate 5 is passed. The bridging portion 7 that is a bridge between the front sidewall portion 41 and the rear sidewall portion 42 in this embodiment can provide large space through which the sliding plate 5 is passed between the back surface 4b of the body 4 and the mounting base 6 and the bridging portion 7.

The pillar garnish 1 includes a restricting portion 8 for restricting displacement of the mounting base 6 toward the middle wall portion 43, that is, toward the inner side of the compartment 2. The restricting portion 8 has a rib-like shape. The restricting portion 8 projects from the back surface 4b of the middle wall portion 43 toward the mounting base 6. Deflection may be developed during mounting of the pillar garnish 1 to the pillar P (deflection of the body 4) because of the space provided between the back surface 4b of the body 4 and the mounting base 6 for the sliding plate 5 to slide therethrough. The restricting portion 8 has a function for reducing the deflection.

The restricting portion 8 includes a vertical rib 81 and a horizontal rib 82 on the back surface 4b of the middle wall portion 43 opposite the mounting base 6. The vertical rib 81 extends along the vertical direction. The horizontal rib 82 extends along the front-rear direction of the vehicle so as to cross the vertical rib 81. The restricting portion 8 further includes vertical ribs 83, 84, 85 and 86 on the back surface 4b of the middle wall portion 43. The vertical ribs 83, 84, 85 and 86 that cross the horizontal rib 82 are arranged along the front-rear direction of the vehicle.

The pillar garnish 1 includes a force transfer portion 9 for easy transfer of a force to the mounting base 6 from the inner side of the compartment 2 toward the outer side of the compartment 2. The force transfer portion 9 is for transferring a force applied to the middle wall portion to the mounting base 6. The force transfer portion 9 is arranged on the inner side of the compartment 2 than the mounting base 6. The force transfer portion 9 includes a force transfer body 9a and a fixing portion 9b. The force transfer body 9a has a plate-like shape that extends in the width direction of the vehicle (the right-left direction of the vehicle). The fixing portion 9b extends in the front-rear direction of the vehicle so as to cross the force transfer body 9a and bridges between the front bridging portion 71 and the rear bridging portion 72 of the bridging portion 7 to fix the force transfer body 9a.

Figure 2:
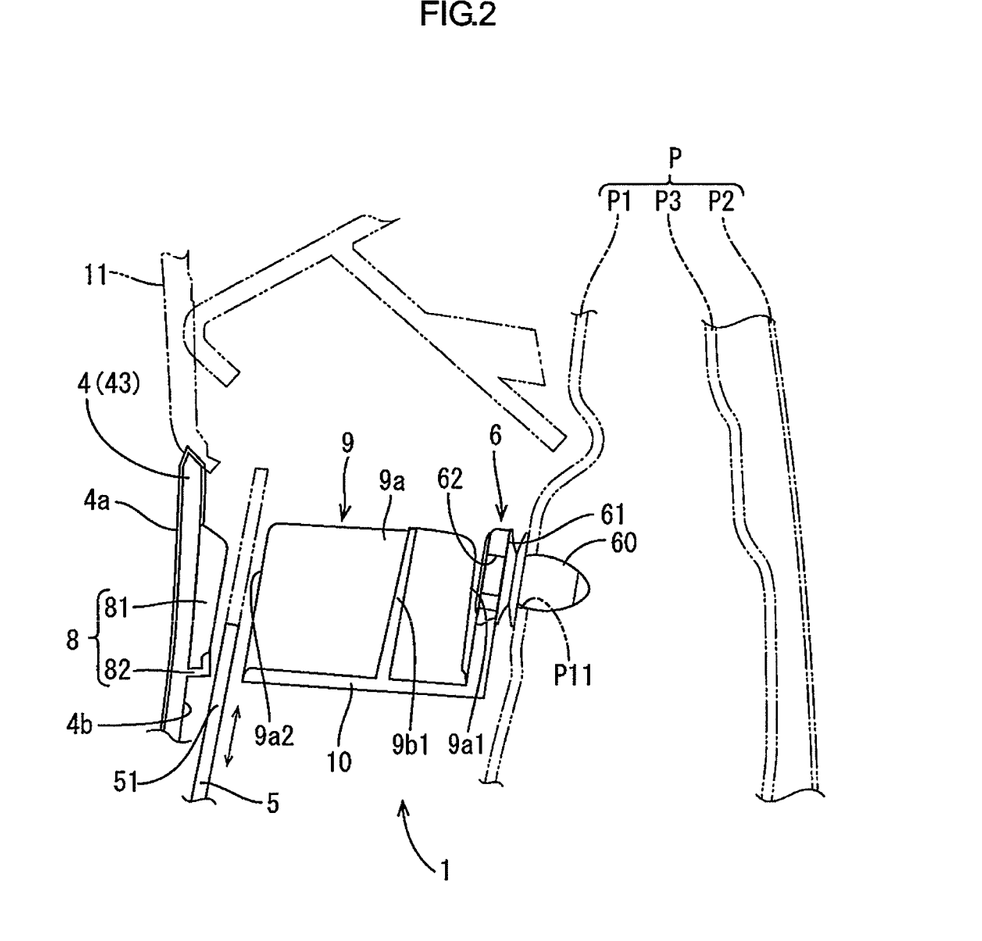
FIG. 2 is a cross-sectional view of FIG. 1 along line A-A.

As illustrated in FIG. 2, a small gap is present between a first end 9a1 of the force transfer body 9a closer to the outer side of the compartment 2 and the mounting base 6 for easy access of the clip 60 to the holding hole 62 formed in the seating surface 61 of the mounting base 6. A second end 9a2 of the force transfer body 9a closer to the inner side of the compartment 2 is opposed to the restricting portion 8 (especially the vertical rib 81). A gap is present between the second end 9a2 of the force transfer body 9a and the restricting portion 8. The upper end 51 of the sliding plate 5 is inserted in the gap when the upper end 51 of the sliding plate 5 is moved above a lower edge of the force transfer body 9a.

The pillar garnish includes a reinforcement portion 10 having a plate-like shape. The reinforcement portion is arranged below the mounting base 6 and the bridging portion 7 (on the lower side of the vehicle) and connected between the front sidewall portion 41 and the rear sidewall portion 42 of the body 4. The reinforcement portion 10 is connected to the bridging portion 7 and the force transfer portion 9 to reinforce the bridging portion 7 and the force transfer portion 9. The reinforcement portion 10 has a planar shape parallel to the horizontal plane (i.e., a plane parallel to the front-rear direction and the right-left direction of the vehicle) and elongated in the front-rear direction of the vehicle. A front end 10a of the reinforcement portion 10 located closer to the front side of the vehicle is connected to the front sidewall portion 41 of the body 4. A rear end 10b of the reinforcement portion 10 located closer to the rear side of the vehicle is connected to the rear sidewall portion 42 of the body 4. The reinforcement portion 10 is arranged so as to support the mounting base 6 and the bridging portion 7 from below. The reinforcement portion 10 continues to the front bridging portion 71 and the rear bridging portion 72 of the bridging portion 7 and the fixing portion 9b of the force transfer portion 9. The force transfer body 9a of the force transfer portion 9 continues to the reinforcement portion 10.

As illustrated in FIG. 3, space in which the sliding plate 5 is inserted is provided between the reinforcement portion 10 and the back surface 4b of the body 4. The reinforcement portion 10 includes a projecting portion 10c at an inner edge of the reinforcement portion 10 closer to the back surface 4b of the middle wall portion 43. The projecting portion 10c projects toward the inner side of the compartment 2. The projecting portion 10c is connected to a portion of the force transfer body 9a near the second end 9a2. The reinforcement portion 10 includes two contact portions 10d, 10e that project toward the outer side of the compartment 2. The contact portions 10d, 10e are in contact with the inner panel P1.

In the pillar garnish 1 having the above configuration, when the occupant moves the knob 53 in the vertical direction, the sliding plate 5 moves in the vertical direction and the height of the seatbelt 3 that is hooked to the sliding plate 5 is adjusted, that is, an upper end of the seatbelt 3 is adjusted relative to the vertical direction.

In the pillar garnish 1, the upper end 51 of the sliding plate 5 is slidable in the vertical direction between the back surface 4b of the body 4 and the mounting base 6 held by the bridging portion 7 without obstruction between the upper end 51 and the mounting base 6.

A method of mounting the pillar garnish 1 to the pillar P will be described with reference to FIG. 8. A portion of the seatbelt 3 retracted inside the body 4 is pulled out of the body 4 through the insertion hole 54 in the sliding plate 5 (from the back surface 4b side to the decorative surface 4a side). While the portion of the seatbelt 3 is out of the body 4, the lower end of the body 4 is mounted to the body of the vehicle with the mounting portions 48, 49 by a known method (such as a method using clips).

The clip 60 held by the mounting base 6 located at the upper end of the body 4 is inserted into the clip hole P11 in the inner panel P1. A person who mounts the pillar garnish 1 to the pillar P pushes the body 4 (more specifically the middle wall portion 43) in a direction from the decorative surface 4a side to the outer side of the compartment 2 indicated by an arrow in FIG. 8 while holding the clip 60 against a peripheral edge of the clip hole P11. As a result, a force is transferred to the mounting base 6 and the clip 60 is inserted in the clip hole P11. As illustrated in FIG. 8, the upper end 51 of the sliding plate 5 overlaps the mounting base 6 and the restricting portion 8 with respect to the width direction (the right-left direction) of the vehicle.

The restricting portion 8 projects from the back surface 4b of the body 4 at the position corresponding to the mounting base 6. The vertical rib 81 of the restricting portion 8 is opposed straight to the mounting base 6. The force transfer portion 9 (more specifically the force transfer body 9a) projects from the mounting base 6 toward the inner side of the compartment 2 so as to be opposed to the vertical rib 81 of the restricting portion 8.

Figure 8:
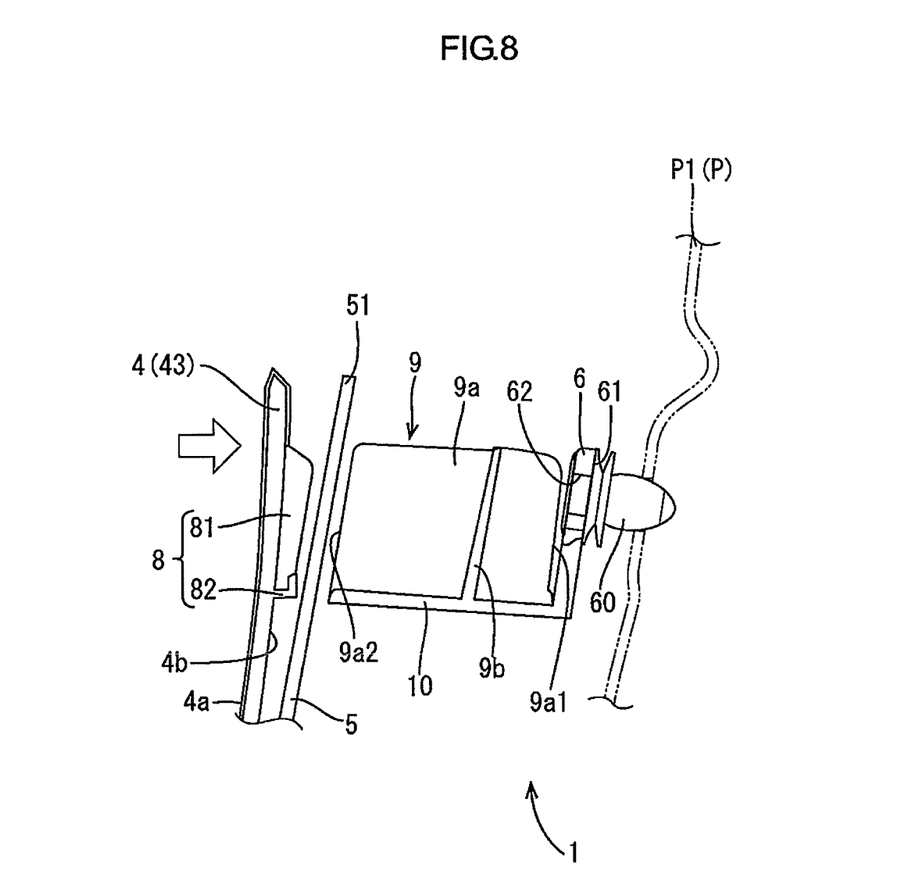
FIG. 8 is a cross-sectional view illustrating how to mount the pillar garnish to a pillar of the vehicle.

As illustrated in FIG. 8, the gap is present between the restricting portion 8 on the back surface 4b of the middle wall portion 43 of the body 4 and the sliding plate 5 before the clip 60 is inserted into the clip hole P11. Furthermore, the gap is present between the sliding plate 5 and the force transfer body 9a of the force transfer portion 9 and another gap is present between the force transfer body 9a of the force transfer portion 9 and the mounting base 6.

When the person pushes the body 4 in the direction from the decorative surface 4a side (the inner side of the compartment 2) to the outer side of the compartment 2, the body 4 moves from the inner side of the compartment 2 to the outer side of the compartment 2. The restricting portion 8 on the back surface 4b of the body 4 pushes the sliding plate 5 from the inner side of the compartment 2 to the outer side of the compartment 2. The sliding plate 5 pushes the force transfer body 9a of the force transfer portion 9 from the inner side of the compartment 2 to the outer side of the compartment 2. Furthermore, the force transfer body 9a pushes the mounting base 6 from the inner side of the compartment 2 to the outer side of the compartment 2. The force applied in a direction from the decorative surface 4a of the body 4 toward the outer side of the compartment 2 (toward the mounting base 6) is transferred to the mounting base 6 via the restricting portion 8, the sliding plate 5, and the force transfer portion 9. The force is then finally transferred to the clip 60 held by the mounting base 6. When the force is applied to the clip 60, the clip 60 is inserted in the clip hole P11 and the pillar garnish 1 is mounted to the pillar P. The clip 60 held by the mounting base 6 is inserted in the clip hole P11 in the pillar P with a relatively small force.

Deflection may be developed during mounting of the pillar garnish 1 to the pillar P (deflection of the body 4) because of the space provided between the back surface 4b of the body 4 and the mounting base 6 for the sliding plate 5 to slide therethrough. With the restricting portion 8 in the pillar garnish 1, the deflection is reduced.

The restricting portion 8 restricts the relative motion of the mounting base 6 in the horizontal direction of the vehicle by holding the sliding plate 5 from the inner side of the compartment 2 during the mounting of the pillar garnish to the pillar P. According to the configuration, the clip 60 held by the mounting base 6 is inserted in the clip hole P11 in the pillar P with a relatively small force.

In the pillar garnish 1, the mounting base 6 is arranged in the moving direction (or the sliding direction) of the sliding plate 5 on the back surface 4b side. However, the mounting base 6 is held by the bridging portion 7 so as to be separated from the back surface 4b and thus the obstruction does not occur between the sliding plate 5 and the mounting base 6. Furthermore, the bridging portion 7 connects the mounting base 6 to the back surface 4b of the body 4, that is, the mounting base 6 is reinforced by the bridging portion 7.

Other Embodiments

The technology described herein is not limited to the above embodiments described in the above description and the drawings. The technology described herein may include the following embodiments.

Figure 9:
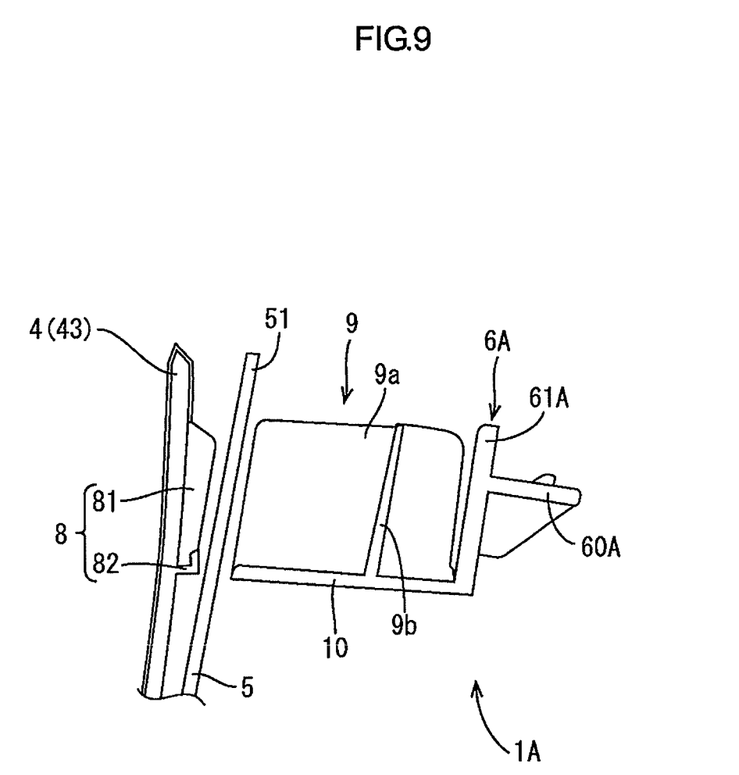
FIG. 9 is a view of a mounting base of a pillar garnish according to another embodiment.

(1) The mounting base 6 is not limited to the clip mounting base for holding the clip 60. A mounting base for holding a mounting fixture for mounting a pillar garnish to a pillar of a vehicle and a mounting base for holding a mounting fixture that is to be pushed into a mounting hole formed in a pillar of a vehicle may be included in the scope of the present invention. For example, a pillar garnish 1A illustrated in FIG. 9 may be included in the scope of the present invention. The pillar garnish 1A includes a mounting base 6A with an insertion portion 60A having a tab-like shape integrally formed with other portions of the mounting base 6A. The insertion portion 60A of the mounting base 6A projects from a seating surface 61A. The insertion portion 60A is inserted in a hole formed in the pillar P and fixed.

Figure 10:
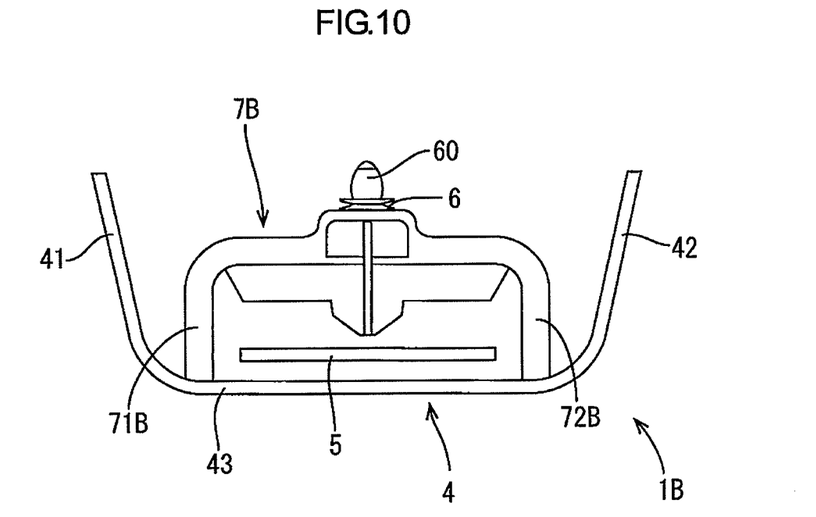
FIG. 10 is a view of a bridging portion of a pillar garnish according to another embodiment.
Figure 11:
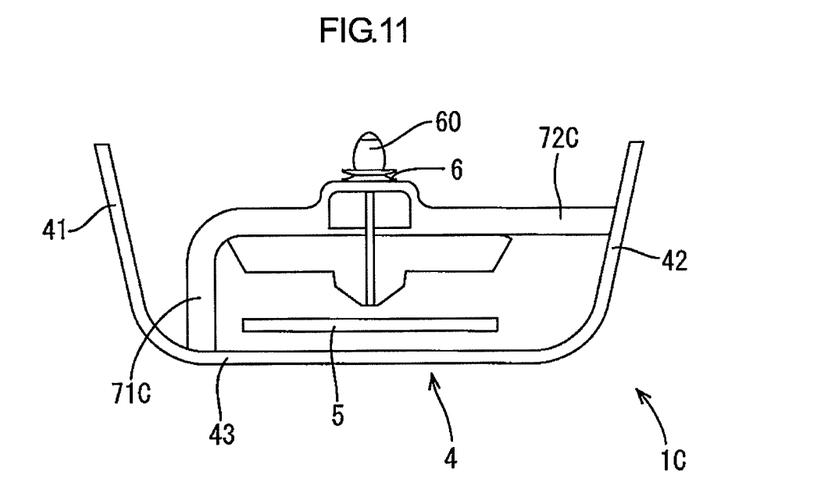
FIG. 11 is a view of a bridging portion of a pillar garnish according to another embodiment.

(2) The bridging portion 7 is not limited to the configuration described above. The bridging portion 7 may have any configuration as long as the space for sliding the sliding plate 5 is provided on the back surface 4b side of the body 4. For example, a pillar garnish 1B illustrated in FIG. 10 may be included in the scope of the present invention. The pillar garnish 1B includes a bridging portion 7B including a front bridging portion 71B and a rear bridging portion 72B on the middle wall portion 43 of the body 4 connected between the middle wall portion 43 and the mounting base 6. A pillar garnish 1C illustrated in FIG. 11 may be included in the scope of the present invention. The pillar garnish 1C includes a bridging portion 7C for bridging between the middle wall portion 43 of the body 4 and one of the sidewall portions (e.g., the rear sidewall portion 42). In this configuration, a front bridging portion 71C connects the middle wall portion 43 to the mounting base 6 and a rear bridging portion 72C connects the rear sidewall portion 42 to the mounting base 6.

(3) The sliding direction of the sliding plate 5 is not limited to the vertical direction. A slide plate configured to rotate, a sliding plate configured to slide in the horizontal direction, e.g., in the front-rear direction of the vehicle may be included in the scope of the present invention.

What is claimed is:

1. A pillar garnish comprising:
   a body including a decorative surface facing an inner side of a compartment of a vehicle and a back surface facing an outer side of the compartment, the body extending in an extending direction of a pillar of the vehicle and to be mounted to the pillar with space between the back surface thereof and the pillar;
   a sliding plate slidable along the back surface;
   a mounting base arranged on a back surface side for mounting the body to the pillar;
   a bridging portion on the body for maintaining space in which the sliding plate is inserted between the back surface and the mounting base and for holding the mounting base, wherein
   the body includes a pair of sidewall portions and a middle wall portion,
   the sidewall portions extend in the extending direction of the pillar, and
   the middle wall portion is arranged between the sidewall portions and opposite the sliding plate; and
   a restricting portion for restricting movement of the mounting base toward the inner side of the compartment relative to the middle wall portion, the restricting portion being located on the middle wall portion at a position opposite the mounting base.

2. The pillar garnish according to claim 1, wherein the bridging portion bridges between the sidewall portions.

3. The pillar garnish according to claim 1, wherein the restricting portion is configured to hold the sliding plate from the inner side of the compartment to restrict the movement of the mounting base relative to the middle wall portion when the pillar garnish is mounted to the pillar.

4. A pillar garnish to be mounted to a pillar of a vehicle, the pillar garnish comprising:
   a body including a decorative surface facing an inner side of a compartment of a vehicle and a back surface facing an outer side of the compartment, and having a long dimension in an extending direction in which the pillar extends, the body including:
     a middle wall portion to be arranged parallel to a surface of the pillar, the middle wall portion including the decorative surface and the back surface, the decorative surface and the back surface facing the inner side of the compartment and the outer side of the compartment, respectively, when the pillar garnish is mounted to the pillar; and
     a first sidewall portion and a second sidewall portion continue from long edges of the middle wall portion, respectively, the first and the second sidewall portions being parallel to each other and perpendicular to the middle wall portion, wherein the middle wall portion, the first sidewall portion, the second sidewall portion, and the surface of the pillar define space when the pillar garnish is mounted to the pillar;
   a sliding plate arranged in the space and slidable along the back surface of the middle wall portion;
   a mounting base for mounting the body to the pillar;
   a restricting portion projecting from the back surface of the middle wall portion toward the mounting base between the back surface of the middle wall portion and the sliding plate and restrict displacement of the mounting base toward the middle wall portion during mounting of the pillar garnish to the pillar; and
   a bridging portion including:
     a first bridging portion continuing from a first end of the mounting base closer to the first sidewall portion to the back surface of the body; and
     a second bridging portion continuing from a second end of the mounting base closer to the second side wall portion to the back surface of the body, wherein
   the middle wall portion, the first sidewall portion, the second sidewall portion, the first bridging portion, the second bridging portion, and the mounting base define space through which a portion of the sliding plate is passed.

5. The pillar garnish according to claim 4, wherein
   the first bridging portion extends from the first end of the mounting base to the first sidewall portion along the back surface of the middle wall portion and connects the first end of the mounting base to the first sidewall portion, and
   the second bridging portion extends from the second end of the mounting base to the second sidewall portion along the back surface of the middle wall portion and connects the second end of the mounting base to the second sidewall portion.

6. The pillar garnish according to claim 5, wherein
   the first bridging portion projects from an upper portion of the first sidewall portion,
   the second bridging portion projects from an upper portion of the second sidewall portion, and
   a portion of the sliding plate inserted in the space defined by the middle wall portion, the first sidewall portion, the second sidewall portion, the first bridging portion, the second bridging portion, and the mounting base is an upper end of the sliding plate.

7. The pillar garnish according to claim 4, wherein the mounting base is a mounting base for holding a mounting fixture that is to be pushed into a mounting hole formed in the pillar.

8. The pillar garnish according to claim 6, further comprising a force transfer portion for transferring a force applied to the middle wall portion to the mounting base, the force transfer portion including:
   a force transfer body having a plate-like shape perpendicular to the back surface of the middle wall portion, arranged between the sliding plate and the mounting base, and extending toward the mounting base, and
   a fixing portion that connects the force transfer body to the first bridging portion and the second bridging portion.

9. The pillar garnish according to claim 4, wherein the mounting base is a mounting base for holding a mounting fixture that is to be pushed into a mounting hole formed in the pillar.

10. The pillar garnish according to claim 9, further comprising a force transfer portion for transferring a force applied to the middle wall portion to the mounting base, the force transfer portion including:
   a force transfer body having a plate-like shape perpendicular to the back surface of the middle wall portion, arranged between the sliding plate and the mounting base, and extending toward the mounting base, and
   a fixing portion that connects the force transfer body to the first bridging portion and the second bridging portion, wherein
   an edge of the force transfer body opposite the back surface of the middle wall portion is opposed to the restricting portion with a gap therebetween.

11. The pillar garnish according to claim 10, wherein
   the portion of the sliding plate inserted in the space defined by the middle wall portion, the first sidewall portion, the second sidewall portion, the first bridging portion, the second bridging portion, and the mounting base is an upper end of the sliding plate, and
   the upper end of the sliding plate is inserted in the gap when the upper end of the sliding plate is moved above a lower edge of the force transfer body.

12. The pillar garnish according to claim 8, further comprising a reinforcement portion having a plate-like shape, arranged below the mounting base and the bridging portion, connected to the first sidewall portion, the second sidewall portion, the bridging portion, and the force transfer portion.

13. The pillar garnish according to claim 12, wherein the reinforcement portion continues from the first bridging portion, the second bridging portion, and the force transfer body.

14. The pillar garnish according to claim 12, wherein
   the reinforcement portion includes a projecting portion and at least one contact portion,
   the projecting portion is located at an edge of the reinforcement portion closer to the back surface of the middle wall portion and separated from the back surface of the middle wall portion, and
   the at least one contact portion is located at another edge of the reinforcement portion and in contact with the pillar when the pillar garnish is mounted to the pillar.

15. The pillar garnish according to claim 6, further comprising at least one mounting portion at a lower edge of the body for mounting the body to the pillar.

16. The pillar garnish according to claim 4, further comprising:
   first guides each extending from the first sidewall portion along the back surface of the middle wall portion; and
   second guides each extending from the second sidewall portion along the back surface of the middle wall portion, wherein
   the first guides are in contact with one of long edges of the sliding plate, and
   the second guides are in contact with another one of the long edges of the sliding plate.

17. The pillar garnish according to claim 10, wherein
   the middle wall portion includes a through hole having a long dimension along a longitudinal direction of the middle wall portion,
   the sliding plate includes a knob projecting from a surface thereof opposite the back surface of the middle wall portion and arranged in the through hole, and
   the upper end of the sliding plate is inserted in the gap between the edge of the force transfer body and the restricting portion when the knob is at an upper edge of the through hole.

* * * * *